United States Patent [19]

Hasl et al.

[11] Patent Number: 4,729,731

[45] Date of Patent: Mar. 8, 1988

[54] LINEAR ACTUATOR FOR LABEL TRANSFER DEVICE

[75] Inventors: Siegfried C. Hasl, 80 Libert Corner, Warren, N.J. 07060; Charles J. Lisnet, Westport, Conn.

[73] Assignee: Siegfried C. Hasl, Warren, N.J.

[21] Appl. No.: 882,212

[22] Filed: Jul. 3, 1986

Related U.S. Application Data

[63] Continuation of Ser. No. 594,883, Mar. 23, 1984, abandoned.

[51] Int. Cl.⁴ .................. B28B 3/00; B29C 33/14; B29C 33/18
[52] U.S. Cl. .................. 425/517; 156/560; 156/570; 156/572; 271/95; 271/102; 271/132; 425/506; 425/522
[58] Field of Search ............... 156/556, 560, 569, 570, 156/572; 425/126 R, 127, 129 R, 506, 509, 514, 517, 522; 271/91, 93, 95, 99, 102, 131-132

[56] References Cited

U.S. PATENT DOCUMENTS

| | | | |
|---|---|---|---|
| 3,292,209 | 12/1966 | Borkmann | 425/522 |
| 4,397,625 | 8/1983 | Hellmer et al. | 425/522 |
| 4,418,906 | 12/1983 | Scott | 271/99 |

Primary Examiner—Merrell C. Cashion, Jr.
Attorney, Agent, or Firm—Larson and Taylor

[57] ABSTRACT

A label transferring apparatus useable for in-mold label application. In a first embodiment, a transfer device is mounted on a linear actuator having a piston rod extending out a first end and carrying the label transfer device and extending out the other end whereat it is supported on a track means. A stack of labels is supplied by corresponding two pairs of magazines located at a first radial position. In a second embodiment the linear actuator is mounted so as to be cantilevered back over the forward end of the piston and cylinder which comprises the linear actuator. In this embodiment the piston and cylinder may be shortened by excluding that portion of the piston rod extending out the other end of the cylinder.

2 Claims, 8 Drawing Figures

LINEAR ACTUATOR FOR LABEL TRANSFER DEVICE

This is a continuation of application Ser. No. 594,883, filed mar. 23, 1984 now abandoned.

BACKGROUND OF THE INVENTION

The present invention relates to apparatus for transferring an object, such as a label, from a pickup point to a delivery point. In particular, the present invention relates to a linear actuator for transporting a label transfer device from a label supply means such as a magazine to a distal location, such as the interior of a mold cavity of a molding machine.

The present invention is an improvement of the invention disclosed in application Ser. No. 544,986, filed Oct. 24, 1983 for IN-MOLD LABEL TRANSFER APPARATUS by the same inventors, that application being incorporated herein in its entirety by reference. That application also discusses the problems and disadvantages existing in the prior art label transferring apparatuses. However, those problems and disadvantages will be summarized herein for convenience.

It is known to apply a label to a plastic container that is made by blow molding by applying the label inside the mold. Previous arrangements for supplying the labels into the mold are depicted, for example, in the U.S. Pat. Nos. Dickinson 3,324,508, Borkman 3,292,209, Hellmer 4,355,967 and 4,359,314, and Hellmer et al 4,397,625. These references are discussed in the aforementioned patent application.

While the prior art does recognize the basic concept of supplying labels at one location and transferring those labels into an open mold at another location, the devices of the prior art suffer from certain disadvantages. Generally, the aforementioned patents disclose label transferring and applying machines having complex structures that are incapable of modification so as to permit their incorporation into conventional, installed mold machinery. Furthermore, the prior art devices do not permit very rapid, yet accurate transferring and positioning of the labels.

The successful, rapid and accurate positioning of a label inside the mold of a molding machine requires the interrelated, cooperative aspects of several components. Of particular importance is the accurate positioning in the transverse, longitudinal and rotational planes of a label transfer mechanism from a first location where a label supply means provides a label to be picked up by the transfer mechanism to a second location where the label is to be deposited such as in the mold cavity of a molding machine.

The problems become even more difficult when the requirement is added that the label delivery apparatus must be designed with flexibility so that it can be incorporated into a number of different types of previously installed molding apparatuses. The requirement for component flexibility also means that the individual components must work separately and in combination in a variety of orientations and in a variety of machinery environments.

The critical interrelationships between the label pickup means and the label supplying means becomes even more important when high label transfer speed and accurate label positioning are required. Consistent accuracy can be achieved if the label transfer mechanism has a simplistic motion and it has to travel a minimal distance. In all of the devices of the aforementioned Dickinson, Borkman, Hellmer and Hellmer et al patents, there is a transverse component of movement between the transfer head and the label both at the moment of pickup of the label and at the moment of transfer of the label to the mold cavity. That transverse component of motion tends to "scuff" the label as it is being transferred, thereby possibly damaging the label and certainly minimizing the ability to perfectly position the label on the label transfer head and within the mold cavity. A simple motion of the transfer head is also dictated in order to permit the retrofitting of a label transfer mechanism to installed molding machines. Therefore, accuracy and speed of label transfer are increased with an increase in the simplicity of label pickup motion and a reduction in the distance of travel.

When considering the further problems of retrofitting an in-mold label application system into an existing, operating molding machine, the existing prior art devices become impossible to modify. The principal reason is that existing molding machines have limited access space both for inserting the label and for installing the label transferring device and the label storage means. Quite often, tnere is a small area into which an extensible label transfer head can be inserted from a distal location. The problem, however, is that the inserted device cannot be supported close to the mold and therefore must be mounted in a cantilever fashion. As is well known, it is very difficult to accurate position a heavy object over an extended distance when that object has been mounted by a cantilever mounting.

Hence, there exists a need for further improvements in apparatus for transferring labels from a label supply means to a mold cavity such that the label can be accurately, yet rapidly transferred and positioned.

SUMMARY OF THE INVENTION

It is, therefore, a purpose of the present invention to provide a new and improved label pickup and transferring apparatus which overcomes the disadvantages and limitations that have existed in the prior art.

The present invention is especially adapted for use with molding machines and is particularly usable with blow molding machines. However, it will be understood that the present invention may also be applicable to other types of molding machines such as vacuum, deep draw plastic forming machines or injection molding machines.

More specifically, the present invention is specifically adapted to being incorporated into existing molding machines which, particularly, have mold halves that move away from each other to dispose of a formed item and to receive additional material, such as a new parison, after which the mold halves move together for the subsequent molding operations. The present invention utilizes the time and spacing when the mold halves are separated from each other for placement of labels into the mold halves.

The present invention provides a linear extension motor for rapidly, repeatedly and accurately transporting a label transfer device from a label pickup location to a distal label deposition location. More particularly, the present invention provides an accurate means for positioning a label transfer device mounted at one end of a piston rod driven by a linear extension motor. In order to achieve the accuracy, the present invention provides a means for reducing the stroke of the linear actuator or by providing an additional piston rod extending out the opposite end of the actuator cylinder and supporting the piston rod at that point.

The goals of the present invention are achieved through embodiments thereof which are described in greater detail below. Generally, however, the embodiments utilize the concept of accurately positioning a label transfer head to receive a label stored in a magazine and then rapidly moving the transfer head between mold halves of a molding machine during the short time that the mold halves are separated to discharge a molded article. The present invention permits the accurate positioning of the transfer head between the mold halves so that the transfer head can accurately position the labels in the mold cavities. Then, the present invention rapidly withdraws the transfer head from the mold so that the molding process can be resumed. This is accomplished by either shortening the stroke of the linear actuator and/or by providing additional support means for the actuator piston rod.

A first embodiment of the present invention utilizes a linear actuator comprising a piston mounted for reciprocal motion in a cylinder and a piston rod connecting to the piston and extending out both ends of the cylinder. Mounting means mount a label transfer device to one end of the piston rod and an alignment means is connected to the other end of the piston rod where it extends outside the rear of the cylinder for maintaining alignment of the piston rod during the movement thereof.

In another embodiment of the present invention, a linear actuator for a label transfer device comprises a piston reciprocally mounted inside a cylinder and a piston rod connected to the piston and extending out a forward end of the cylinder. The forward end of an elongated label transfer device is mounted with cantilever means to the forward piston end such that the label transfer device extends rearwardly over the cylinder forward end when the piston is at a rearward portion of the cylinder. In this embodiment of the invention, the accuracy of the positioning of an extended label transfer device is increased by shortening the stroke of the piston rod.

Hence, it is an object of the present invention to provide a new and improved label transferring apparatus usable for inmold labeling.

It is still another object of the present invention to provide a new and improved label transferring apparatus which recognizes the overall blow molding cycle and utilizes different portions of the cycle to enhance the efficiency of the label transferring apparatus.

It is still another object of the present invention to provide a new and improved mechanism for direct, rapid movement of a label transfer head from a first position in which a label can be picked up from a label storing means to a second position where the label can be applied to the interior of a mold cavity.

It is still another object of the present invention to provide a new and improved mounting and transporting means for mounting and transporting a label transfer head between a label storing magazine to an accurate position located between two spaced apart mold halves in a simple, direct line of motion.

It is still another object of the present invention to provide means for accurately positioning a label transfer head attached to a linear actuator when the actuator is in the extended position and the cantilever mounting of the transfer head is at a distal, extended position.

These and other objects of the present invention will become apparent from the detailed description to follow, taken together with the accompanying drawings.

BRIEF DESCRIPTION OF THE DRAWINGS

There follows a detailed description of preferred embodiments of the present invention which are to be read in light of the accompanying drawings wherein.

DETAILED DESCRIPTION OF THE PREFERRED EMBODIMENTS

Figure 1:
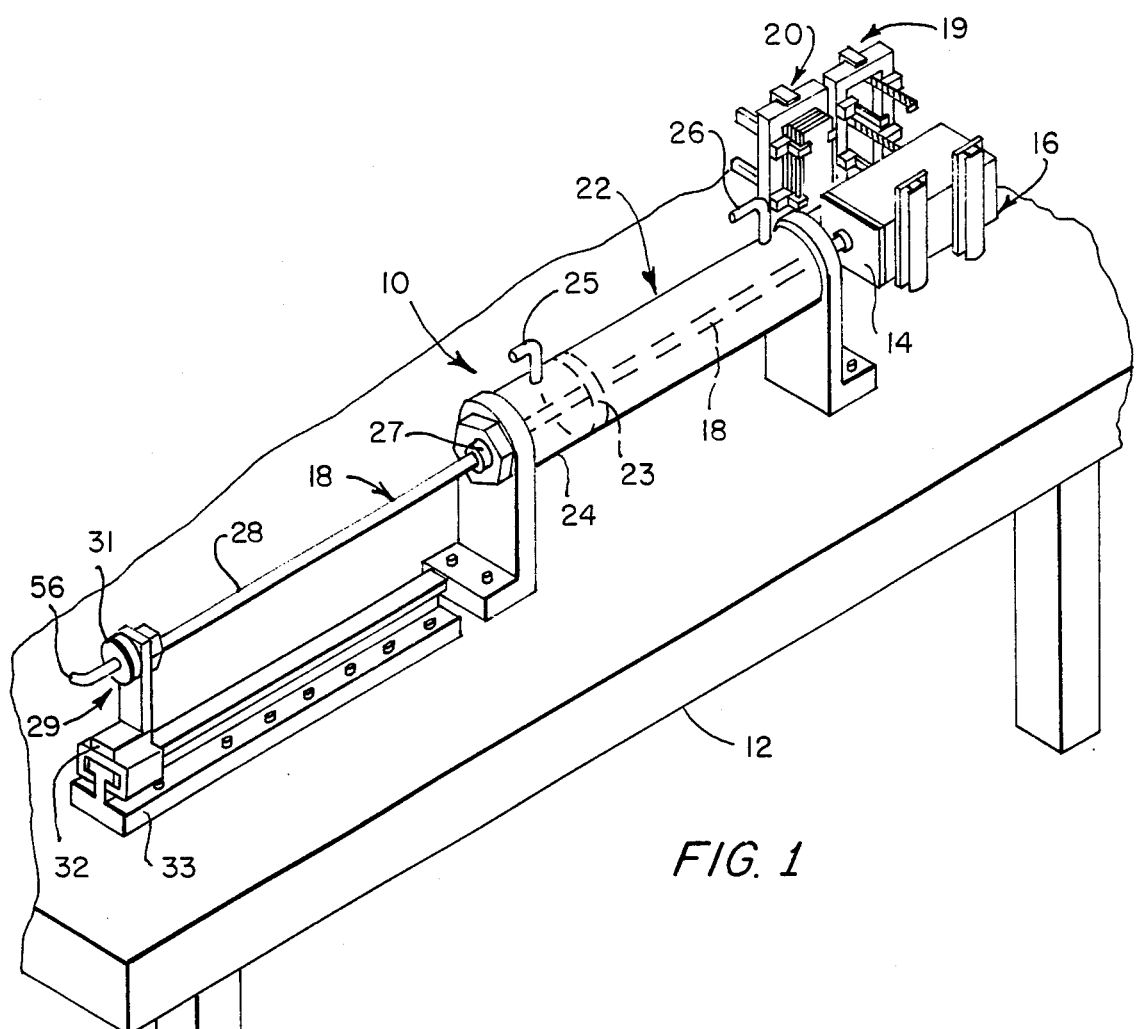
FIG. 1 is a perspective view with parts removed for clarity illustrating a linear actuator having a label transfer device mounted at the forward end thereof in front of a label magazine and having a means for supporting a portion of the piston rod that extends outside the rearward portion of the cylinder.

There follows a detailed description of preferred embodiments of the present invention wherein like elements are represented by like numerals throughout the several views. Referring to FIG. 1, one embodiment of a linear actuator 10 is shown. Actuator 10 extends in the longitudinal direction and is horizontally mounted by means such as a support table 12. A cantilever mounting means comprising a mounting plate 14 mounts the rearward end of an elongate label transfer device 16 to the forward end of a piston rod 18. Label transfer device 16 is shown in FIG. 1 positioned in a label pickup location in front of two horizontally mounted label magazines, a forward magazine 19 and a rearward magazine 20. It will be appreciated that a second pair of a forward and a rearward label magazine is positioned transversely opposite magazines 19 and 20 at the label pickup location or position, but have been removed from FIG. 1 for purposes of clarity.

Linear actuator 10 is comprised of a linear extension motor 22 comprising the aforementioned piston rod 18, a piston 23 rigidly connected to a mid-portion of piston rod 18, and an elongate cylinder 24 housing the piston 23. A pressurized fluid is admitted to either the rearward side of piston 23 with a hose 25 or to the forward side of piston 23 with a forward hose 26. Preferably, extension motor 22 is pneumatically operated with pressurized air. However, any pressurized fluid, such as a hydraulic oil, or an electrically powered ball screw can be utilized. In addition, a fluid delivery means selectively admits a pressurized fluid to one side of piston 23 while venting the other side thereof for driving piston 23 and the attached piston rod 18 in the desired direction. Thus, for example, if pressurized air is admitted through hose 25 through a directional valve (not shown), hose 26 will be connected to atmosphere.

Piston rod 18 extends completely through cylinder 24 and is sealingly mounted for longitudinal movement at the forward cylinder end and the rearward cylinder end by corresponding slide bearings 27. The rearward part of piston rod 18 is also denoted the tail rod 28. Tail rod 28 is rigidly mounted at its forward end to piston 23 and is rigidly mounted at its rearward end to a trolley 29. As mentioned above, piston rod 18 is preferably a single, unitary rod extending from trolley 29 through cylinder 24 to label transfer device 16.

Figure 2:
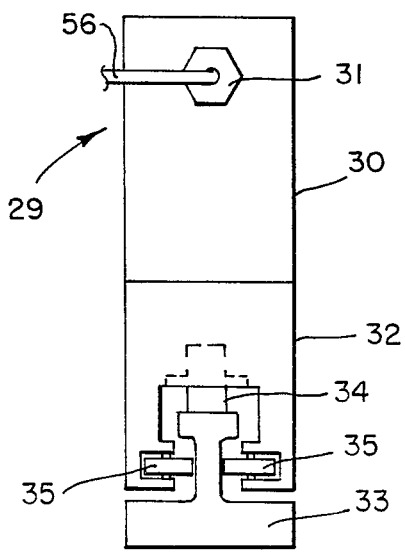
FIG. 2 is a diagrammatic, end view of the linear actuator of FIG. 1.

With reference also to FIG. 2, trolley 29 is comprised of a mounting plate 30 rigidly mounted to the end of tail rod 28 with means such as a nut 31 connected to a threaded portion of tail rod 28. Connected to the lower part of mounting plate 30 is a trolley housing 32. Trolley housing 32 engages a rail 33 which is rigidly mounted to support table 12 with means such as bolts, and which extends parallel to and under tail rod 28. Three sets of rotatably mounted wheels, a top wheel 34 and side wheels 35 and 36 engage corresponding portions a rail 33. Thus, trolley 29 is both supported and kept in alignment by rail 33.

Figure 2A:
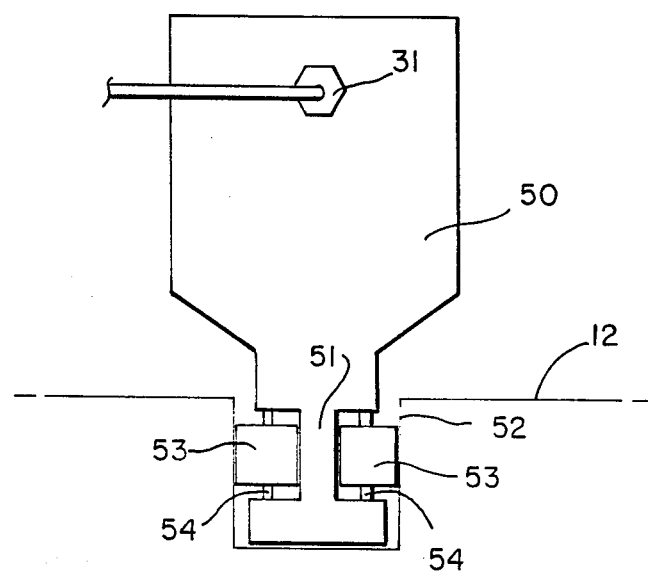
FIG. 2A is a transverse view similar to FIG. 2, but showing a modified track structure.

FIG. 2A illustrates a modification of the track structure wherein plate 30 is replaced by a plate 50 which rides in a groove 52 formed in table 12. Rollers 53 mounted on shafts 54 formed by plate 50 engage the sides of groove 52. The bottom of plate 50 is either of a low friction material or would include a third roller, such as roller 34 of FIG. 2, bearing against the bottom of groove 52.

Figure 4:
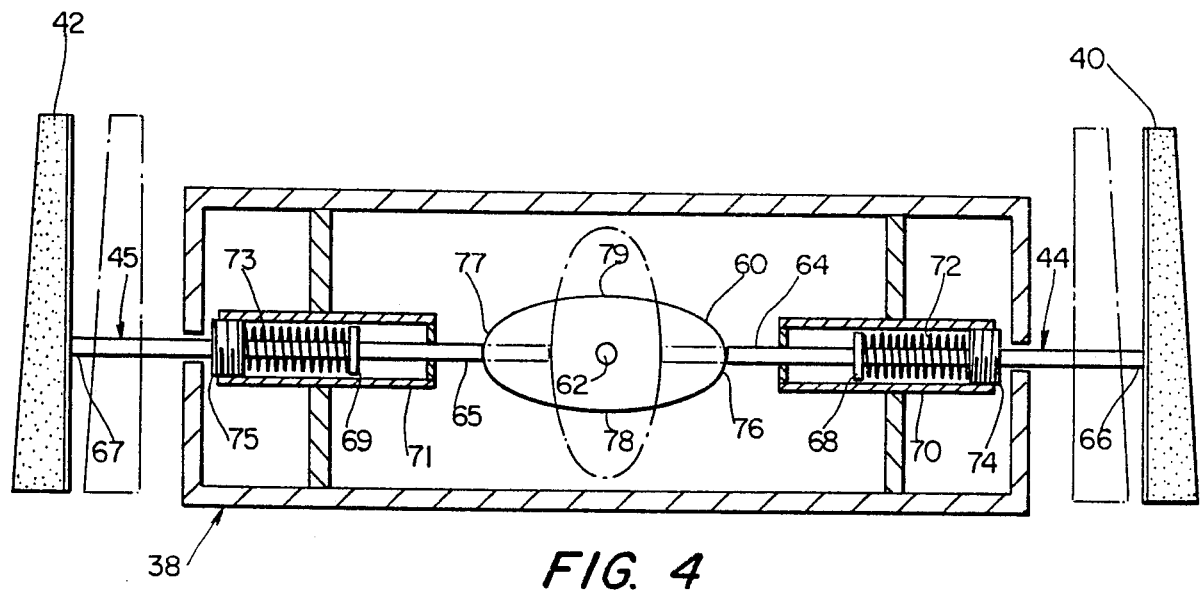
FIG. 4 is a diagrammatic, cross-sectional illustration of a cam actuated transfer head positioning means.

As shown in FIG. 1, label transfer device 16 comprises a housing or frame 38 onto which two pairs of oppositely opposed transfer or heads 40 and 42 are mounted with rods 44 and 45, respectively (see also FIG. 4). Transfer heads 40 and 42 are movable in mutually parallel directions that are perpendicular to the direction of movement of radial arm 18, which, as shown by arrow 46, is in the transverse direction in FIG. 1.

Transfer heads 40 and 42 are comprised of a rigid plastic pad 50 having a plurality of orifices 52 aligned in a row and extending therethrough to a plenum (not shown) located between the back surface of pad 50 and a backing plate 54. A vacuum tube 56 is connected to the rear of trolley mounting plate 30 and a vacuum is applied to transfer head orifices 52 through a base (not shown) through tubing (also not shown) connected to the forward end of piston rod 18 and through the aforementioned plenum.

It has been found that transfer heads 40 and 42 are effective for transferring a label L (shown only as attached to transfer heads 42) that has a length greater than the width of pad 50 so that the edges of label L can curl around pad 50. Preferably, a label L to be transferred by heads 40 and 42 is relatively thin and flexible, and thus has a very light weight.

Magazines 19 and 20 can be either independently mounted on support table 12, or as shown in FIG. 1, can be attached to one another along their interior edges. Stacks of labels L are stored in magazines 19 and 20 and are fed thereby with means described in greater detail hereinbelow.

One type of mounting and moving means for pickup heads 40 and 42 is shown in FIG. 4. Rotatably mounted inside frame 38 is an oblong-shaped or racetrack shaped cam 60 rigidly attached to a shaft 62. Cam 60 is rotated by any type of means, such as a power servo motor, a rotary electrical motor, a stepping motor or a rotary actuator, any one of which can be driven by pneumatics, hydraulics, electricity, solid state electronic devices or turbines.

As can be clearly seen in FIG. 4, heads 40 and 42, mounted on their respective rods 44 and 45 are rigidly, colinearly mounted inside frame 38. Proximal ends 64 and 65 of rods 44 and 45 engage cam 60 and ride along the outer surface thereof. Thus, proximal ends 64 and 65 serve as cam followers. The distal ends 66 and 67 are rigidly, removably mounted onto heads 40 and 42, respectively, with means such as bolts (not shown). Rigidly mounted to respective mid portions of rods 44 and 45 are disks 68 and 69 and mounted around the disks 68 and 69 and the mid portions of rods 44 and 45 are respective cylinders 70 and 71. Coil springs 72 and 73, mounted inside cylinders 70 and 71 around rods 44 and 45, respectively, extend between removable slide bearing end plugs 74 and 75 and disks 68 and 69, respectively. Thus, rods 44 and 45 are slidably, resiliently mounted inside cylinders 70 and 71, respectively, in cam following engagement with respective locations of cam 60.

Cam 60 has a shape that provides two maximum points or lobes 76 and 77 and two minimum cam lobes 78 and 79 such that as cam 60 is rotated, rods 44 and 45 are alternately at their outermost, label pickup position (indicated by solid lines in FIG. 2) and their retracted, innermost position (indicated by dashed lines in FIG. 2). As a result of the shape of cam 60 transfer heads 40 and 42 have a rapid rate of retraction.

Figure 5:
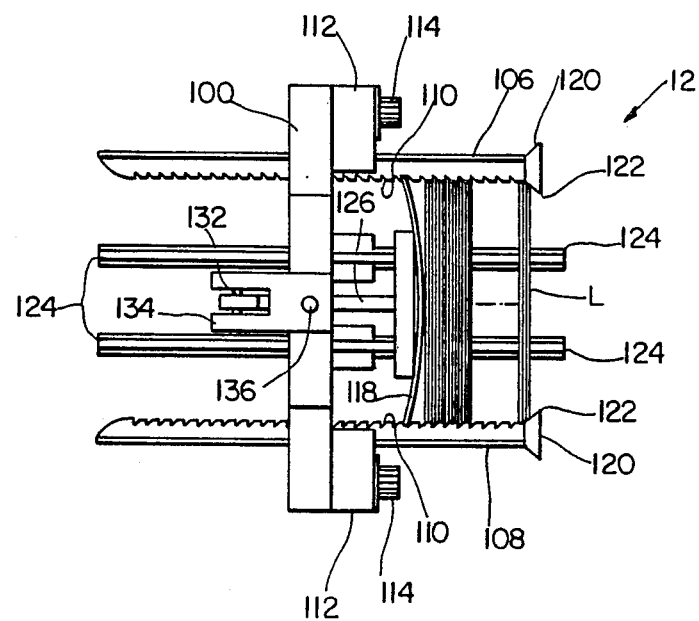
FIG. 5 is a top plan view of the label magazine.

Referring now to FIGS. 1 and 5, there is shown one type of magazine 19 which can be used with the present invention. Magazine 19 comprises a sturdy, rigid metal bar frame 100 that has an annular generally rectangular shape. The shape of frame 100 provides for greater flexibility in orientation and location. In addition, as shown in FIG. 1, the frame of magazine 19 can be rigidly attached to the frame of magazine 20.

Mounted onto magazine frame 100 is a label feeding means that positively supplies labels L so that the outermost label is always in approximately the same position, on the one hand, and yet the label is rigidly held at that position when transfer head 40 or 42 comes into contact therewith. The label feeding means is comprised of two pairs of two spaced apart bars 106 and 108, each bar 106 and 108 having a plurality of ratchet teeth 110 mounted on the inwardly facing surfaces thereof. Bars 106 and 108 are mounted to individual mounting blocks 112 which in turn, are removably, rigidly mounted onto frame 100 with screws 114. Mounting block 112 can be mounted with any one of a plurality of holes (not shown) provided in frame 100 along the periphery thereof. In this way, different shaped and sized labels can be accommodated with a single size magazine frame 100. The label feeding means further includes a flexible label backing plate or pad 118 which is preferably made of a rigid plastic material so that labels L will not be cut or ratchet teeth 110 worn too quickly. Plate 118 is preferably curved and has is thin at the transverse edges so that they can be engaged by ratchet teeth 110. Bars 106 and 108 with their ratchet teeth 110 and plate 118 together comprise a ratchet mechanism for feeding labels to a label supply location.

Rigidly mounted to the end of each bar 106 or 108 of magazine 19 is a retaining finger 120 that has an inwardly projecting tip 122. Finger 120 is rigidly mounted to the end of the respective bar 106 or 108 by means such as being welded or attached with screws. Tip 122 preferably has an inclined surface with an angle that will retain the outermost label, on the one hand, yet will release it to a transfer head, on the other hand. Mounted to the bottom of frame 100 are a pair of support members 124. Support members 124 preferably have a smooth upper surface and are for supporting the bottom of labels L while still permitting the labels L to slide therealong.

Label backing plate 118 is resiliently urged in an outward direction by a spring means comprised of a pivotally mounted arm 126 having a bend therein and a coil spring (not shown) mounted between the bottom surface of the top of frame 100 and a point near the bend. Arm 126 is mounted at its upper end with a pivot pin 132 to a mounting block 134, which in turn, is rigidly mounted with means, such as a screw 136 to the top of frame 100. The other end of spring arm 126 is rigidly mounted to the back of plate 118.

Figure 3:
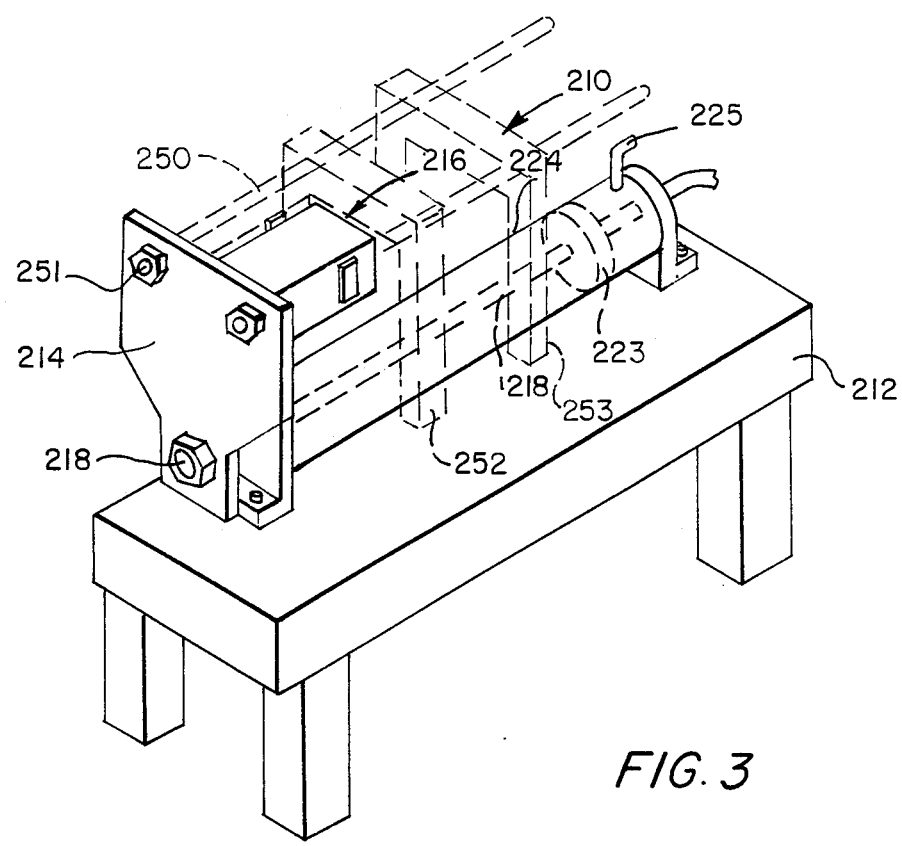
FIG. 3 is a perspective view of a second embodiment of the present invention, showing a linear actuator and a label transfer device mounted to the forward end of the actuator with a cantilever mounting member.

A second embodiment of a linear actuator 210 is shown in FIG. 3 and is mounted on a support table 212. Linear actuator 210 includes a cantilever mounting plate 214 for mounting a label transfer device 216 onto the forward end of a piston rod 218. Linear actuator 210 also includes a piston 223 connected to a rearward portion of piston rod 218, and a cylinder 224 which houses piston 223 and part of piston rod 218. Pressurized fluid is applied into cylinder 224 on either the rearward side of piston 223 with a rear hose 225 or on the forward side of piston 223 with a forward hose (not shown).

Label transfer device 216 is substantially identical to label transfer device 16 depicted in FIG. 1. The only substantial difference is that the rearward end of transfer device 16 is mounted onto mounting plate 14 of linear actuator 10 whereas the forward end of label transfer device 216 is mounted onto an upper portion of mounting plate 214 such that said transfer device 216 is located along the lateral sides of the cylinder 224 between transverse planes passing through the front end and rear end of the cylinder 224. In this manner, label transfer device 216 has a cantilever mounting and requires less longitudinal space for its positioning. With less longitudinal space required, piston rod 218 can be shorter and thus the moment exerted by the weight of transfer device 216 is less when piston rod 218 is fully extended. Consequently, by using the cantilever mounting of label transfer device 216, it can be more accurately positioned.

Figure 6:
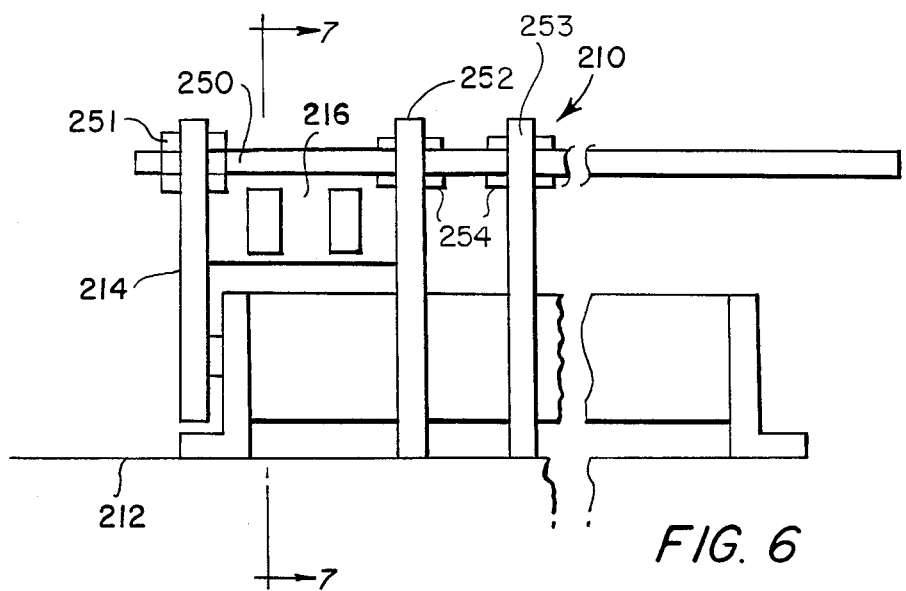
FIG. 6 is a side elevational view of FIG. 3, illustrating more clearly the guide mechanism for the transfer device.
Figure 7:
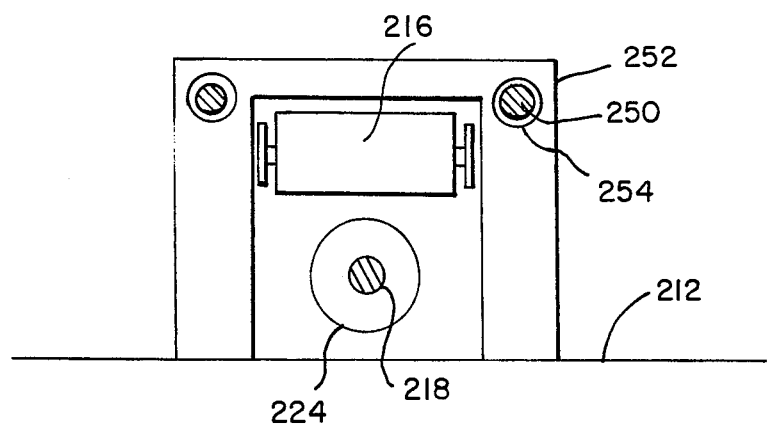
FIG. 7 is a cross-sectional view taken along line 7—7 of FIG. 6.

In order to avoid turning movements of the transfer device 216 in a vertical plane about a transverse axis passing through the lower portion of plate 214, a guide means is provided. This guide means is shown in dashed lines in FIG. 3 and in greater detail in FIGS. 6 and 7. As shown therein a pair of brackets 252 and 253 are rigidly mounted to support table 212. A pair of guide rods 250 which are fixed to the plate 214 by bolts 251 are then slideably mounted in the brackets 252 and 253, passing through suitable bearings 254. The rod 250 is long enough that when the linear accuator 210 moves to its forwardmost position (leftmost as shown in the drawings) the right hand end of rod 250 will not have passed through the opening of bracket 253.

It will be understood that the feature shown in FIG. 3 of mounting the transfer device over the forward end of the cylinder can also be applied advantageously to the embodiment of FIG. 1 to shorten the distance between the linear actuator 10 and the space between the mold halves.

Referring now to FIG. 1, the operation of linear actuator 10 will be described in general terms. However, it is to be appreciated that with obvious differences, the operation of linear actuator 210 will be similar.

Label transfer device 16 is initially positioned by linear actuator 10 so that pickup heads 40 and 42 are in transverse alignment with magazines 19 and 20. Cam 60 (FIG. 4) is activated, causing rods 44 and 45 to be resiliently extended outwardly in the transverse direction, which is perpendicular to direction of movement of piston rod 18 and thus the direction of movement of transfer device 16. At the same time, a vacuum is applied through hose 56 to transfer heads 40 and 42 as the heads move transversely outwardly and into engagement with the outermost label L. As soon as contact is made, further outward movement heads 40 and 42 is resisted as a result as the ratchet mechanism of magazines 12 and 14.

This provides a firm contact between the outer surface of heads 40 and 42 and the outermost label L. As cam 60 continues to turn, springs 72 and 74 will rapidly return heads 40 and 42 to their respective withdrawn positions taking with them the corresponding labels now securely attached to the outer surfaces of the heads. Air is then emitted through fluid line 25 to cause piston 23 to move to the right as shown in FIG. 1, thereby similarly causing piston rod 18, trolley 29, and transfer device 16 also to move to the right. Transfer device 16 is thus moved to a distal location where a molding apparatus (not shown) is located. While device 16 is being positioned, cam 60 continues to rotate and the transfer heads 40 and 42 begin to move in the transverse outward directions. With proper timing and transverse distances properly selected, the transfer device may enter the space between the mold halves of the molding apparatus at exactly the correct time as transfer heads 40 and 42 are being moved in the outward direction so as to minimize the amount of time that device 16 is between the two mold halves. When transfer heads 40 and 42 have been extended to their full outward position, they will be in contact with the inner surfaces of the mold cavities. At that time, the vacuum being supplied to heads 40 and 42 is terminated and a vacuum is applied to the mold halves so as to retain the labels therein. Cam 60 continues to turn and with proper timing, after the label transfer, transfer heads 40 and 42 are again rapidly withdrawn. Simultaneously, pressurized air is admitted to fluid line 26 while fluid line 26 is vented. This causes piston 23 to be driven in the left-hand direction and transfer device 16 to be again positioned in front of magazines 19 and 20. The mold halves can then be closed and the molding process begun while new labels are picked up.

It will be understood that these improvements in linear actuators may be applicable to any of the label transfer apparatus described in the the aforementioned patent application.

The operation of the various embodiments have either been discussed during the description of the respective embodiments or will be apparent therefrom.

Although the invention has been described with respect to specific embodiments, it will be apparent that the invention is capable of numerous modifications and variations without departing from the spirit and scope of the invention.

We claim:

1. An in-mold label transferring apparatus comprising:
   a cylinder defined by lateral sides extending from a front end to a rear end, a piston mounted in said cylinder for linear reciprocating movement along a first axis between a retracted position and an extended position, fluid supply means for selectively supplying a pressurized fluid on either side of said piston,
   a piston rod connected to said piston and extending out the front end of the cylinder,
   a mounting plate fixedly connected to said piston rod at a location where the piston rod extends out beyond the front end of the cylinder, said mounting plate extending in a direction transverse to said first axis,
   a label transfer head connected to the mounting plate and extending as a cantilever from the mounting plate in a direction back toward the said rear end of the cylinder, extending along a second axis parallel to and spaced from the first axis,
   wherein, in the extended position of the piston, the label transfer head is located forwardly beyond the said front end of the cylinder, and in the retracted position of the piston, the label transfer head is located along the lateral sides of the cylinder between transverse planes passing through the front end and the rear end of the cylinder,
   the label transfer head having at least one label pickup head extendable and retractable in a direction essentially perpendicular to a reference plane passing through said first and second axis, to pickup and deliver labels from and to locations located laterally to the side of said reference plane,
   said apparatus including a label pickup location located laterally to at least one side of said reference plane, between said transverse planes passing through said front and rear ends of the cylinder,
   and said apparatus further including opposed mold halves which comprise said label delivery location, said delivery location located laterally to the side of said reference plane, forwardly, beyond the said front end of the cylinder.

2. An in-mold label transferring apparatus according to claim 1, including a pair of guide rods connected to the transfer head, bracket means for mounting said guide rods to assure linear travel of the transfer head along said second axis upon movement of the piston and cylinder along said first axis.

* * * * *